United States Patent [19]

Hamerdinger et al.

[11] 4,233,568
[45] Nov. 11, 1980

[54] LASER TUBE MIRROR ASSEMBLY

[75] Inventors: Randolph W. Hamerdinger; Robert C. McQuillan, both of Glendora, Calif.

[73] Assignee: Xerox Corporation, Stamford, Conn.

[21] Appl. No.: 552,396

[22] Filed: Feb. 24, 1975

[51] Int. Cl.$^2$ .............................................. H01S 3/08
[52] U.S. Cl. ............................................. 331/94.5 D
[58] Field of Search ................... 331/94.5 C, 94.5 D, 331/94.5 G

[56] References Cited

U.S. PATENT DOCUMENTS

| | | | |
|---|---|---|---|
| 3,555,450 | 1/1971 | Rockwell, Jr. | 331/94.5 D |
| 3,717,823 | 2/1973 | Abdale et al. | 331/94.5 D |
| 3,751,139 | 8/1973 | Malherbe | 331/94.5 D |

*Primary Examiner*—William L. Sikes
*Attorney, Agent, or Firm*—Irving Keschner

[57] ABSTRACT

A laser tube end assembly which comprises a laser mirror sealed to each end of the laser tube, the seal withstanding the relatively high temperatures utilized to remove contaminants from the laser tube during fabrication thereof, the sealant also minimizing gas permeation therethrough during laser tube utilization. The assembly is fabricated by first preparing an apertured recessed metal flange member. A slurry, comprising a glass frit and carrier, is introduced into the metal flange member and allowed to dry. The metal flange member is placed in a first portion of a fixture and a glass substrate having a reflecting layer coated thereon is positioned adjacent the flange member recess with the reflecting layer being at least coextensive with the aperture. The weighted second portion of the fixture contacts the non-reflecting side of the glass substrate to ensure that the glass substrate reflecting layer is in contact with the surface of the metal flange member via the dried slurry. The fixture is placed in an oven, the temperature thereof being increased to the fritting temperature of the glass frit for a predetermined time period, the oven thereafter being slowly cooled. The glass substrate is now hard-sealed to the metal flange member, forming the aforementioned assembly, the assembly being joined to a mating flange formed on the laser tube. The reflecting layer is selected to withstand the fritting temperatures with minimal optical and mechanical changes and the glass substrate is selected to retain its mechanical dimension during and after thermal cycling to the fritting temperatures. The glass substrate, the sealant mixture and the metal flange member are selected to have closely matched coefficients of thermal expansion to minimize seal leakage during laser tube operation.

30 Claims, 4 Drawing Figures

LASER TUBE MIRROR ASSEMBLY

BACKGROUND OF THE INVENTION

In the fabrication of prior art gas laser tubes, the hermetic seal between each end of the tube and an associated optical element, such as a window, is accomplished by either means of thermal bonding or an epoxy gluing technique.

In the case of thermal bonding, the seal is made by holding the element and tube end in contact and raising the temperature to the melting point in the region of contact, as by r.f. induction or oven heating. The temperatures required for making such thermal bonds are on the order of at least several hundred degrees centigrade and have the concomitant effect of degrading the laser quality surface finish of the element, which in turn adversely affects light output during lasing operation. This problem can be avoided by using the epoxy gluing technique, but problems attendant with using epoxy also arise. For instance, the epoxy constituents tend to leak into the gas fill of the tube thereby causing contamination of the gas and seriously diminishing tube life. In addition, during tube useage the stability of operation with regard to lasing threshold, gain and power output progressively deteriorate due to the contamination. Another disadvantage of the epoxy technique is that it inhibits proper bakeout for removing contaminants during construction of the tube. It is generally desired that a bakeout be performed with the tube heated to a temperature of about 400° centigrade while connected to a vacuum pump for evacuating water vapor and other contaminants which accumulated in the tube during manufacture. Epoxy has the characteristic, however, that it tends to become brittle and subject to breaking or cracking when heated above approximately 75° centigrade. Moreover, heating of the epoxy to temperatures in excess of this level tends to accelerate the aforementioned contamination process associated with leaking of the epoxy constituents into the laser gas. In addition, the epoxy may degrade to the point at which it can no longer provide a leak tight seal. Other window assemblies have employed optically flat contacts, i.e., the window member is ground to an optical flatness and the tube to which it is to be joined is ground to an optical flatness and the two surfaces are pressed together to form a gas tight seal therebetween. In still other windows, the quartz or glass window member has been fused to a quartz or glass tubular extension of the envelope. In still another prior art embodiment the window member has been joined to the tubular envelope by means of a solder glass. The latter named techniques have one or more drawbacks associated therewith. For example, the optical window utilizing optical fits between abutting surfaces to form the seal cannot tolerate drastic temperature changes, and such optically flat contacting surfaces are generally expensive and difficult to produce. As to the prior art windows which have been fused to the envelope, these windows are typically relatively expensive to produce and require that a part of the window material be softened by heating during the joining process. This heating of the window creates strains which can alter the surface of the window and disturb the wave front and/or plane of polarization of the laser beam, thereby drastically reducing the power output obtained from the laser. Windows sealed to the envelope by means of solder glass are easier to fabricate than fused windows but suffer from strains which can alter the window surface and create disturbances of the wavefront or plane of polarization of the laser beam transmitted through the window.

Therefore, a need exists for a laser mirror assembly, the assembly comprising a mirror sealed to a metal frame member, which is capable of withstanding the relatively high bakeout temperatures utilized for evacuating contaminants from the fabricated laser tube, the seal additionally minimizing gas leakage therethrough during normal laser operation. This would eliminate the necessity of a specially designed laser optical element, as shown in U.S. Pat. No. 3,555,450, which allows grinding and polishing of the optical element after it has been assembled into the frame structure and subsequent to high temperature bakeout. Further, the laser mirror assembly should provide an essentially vacuum tight laser tube, be insensitive to thermal cycling within predetermined temperature ranges, not be effected by humidity, whereby laser tubes of relatively long shelf and operating lifetimes can be realized.

SUMMARY OF THE PRESENT INVENTION

The present invention provides a laser tube end assembly which comprises a laser mirror sealed to each end of a laser tube, the seal withstanding the relatively high temperatures utilized to remove contaminants from the laser tube during fabrication thereof, the sealant also minimizing gas permeation therethrough during laser tube utilization. The assembly is fabricated by first preparing an apertured, recessed metal flange member. A slurry, comprising a glass frit and carrier, is introduced into the metal flange member and allowed to dry. The metal flange member is placed in a first portion of a fixture and a glass substrate, having a reflecting layer coated thereon, is positioned adjacent the flange member recess with the reflecting layer being at least coextensive with the aperture. The weighted second portion of the fixture contacts the non-reflecting side of the glass substrate to ensure that the glass substrate reflecting layer is in contact with the surface of the metal flange via the dried slurry.

The fixture is placed in an oven, the temperature thereof being increased to the fritting temperature of the glass frit for a predetermined time period, the oven thereafter being slowly cooled. The glass substrate is now hard sealed to the metal flange member forming the aforementioned assembly, the assembly being joined to a mating flange formed on the laser tube. The reflecting layer is selected to withstand the fritting temperatures with minimal mechanical or optical changes and the glass substrate is selected to retain its mechanical dimension during and after thermal cycling to the fritting temperatures. The glass substrate, the sealant mixture and the metal flange member are selected to have closely matched coefficients of thermal expansion to eliminate seal leakage during laser tube operation.

It is an object of the present invention to provide a method for forming a hard seal between a laser reflecting element and a metal flange member.

It is a further object of the present invention to provide a method for joining a laser optical mirror assembly to the end of a laser tube whereby the optical mirror is hard sealed within the apertured recess of a metal flange member, the metal flange member in turn being joined to a mating flange formed on the laser tube ends.

It is still a further object of the present invention to provide a laser end mirror assembly which is joined to the laser tube ends, the assembly comprising a glass substrate having a reflecting layer thereon which is hard sealed to a metal flange member, the assembly being joined to a mating flange member on the tube ends, the seal withstanding the temperatures utilized to remove contaminants from the laser tube assembly.

It is a further object of the present invention to provide a method for forming a laser end mirror assembly wherein a glass substrate having a reflecting layer thereon is hard sealed to a metal flange member, the mirror coating being selected to withstand fritting temperatures with minimal mechanical or optical changes, the glass substrate being selected to retain its mechanical dimension during and after thermal cycling to the fritting temperatures; the glass substrate, the sealant and the metal flange member being selected to have closely matched coefficients of thermal expansion to minimize seal leakage during laser tube operation.

It is still an object of the present invention to provide a laser end mirror assembly which allows an essentially vacuum tight laser tube to be realized, is insensitive to thermal cycling within predetermined temperature ranges, and is not effected by humidity whereby the laser tube has relatively long shelf and operating lifetimes.

It is a further object of the present invention to provide a laser tube having an end mirror assembly as described hereinabove.

DESCRIPTION OF THE DRAWINGS

For a better understanding of the invention, as well as other objects and further features thereof, reference is made to the following description which is to be read in conjunction with the accompanying drawings wherein.

DESCRIPTION OF THE PREFERRED EMBODIMENT

Figure 1:
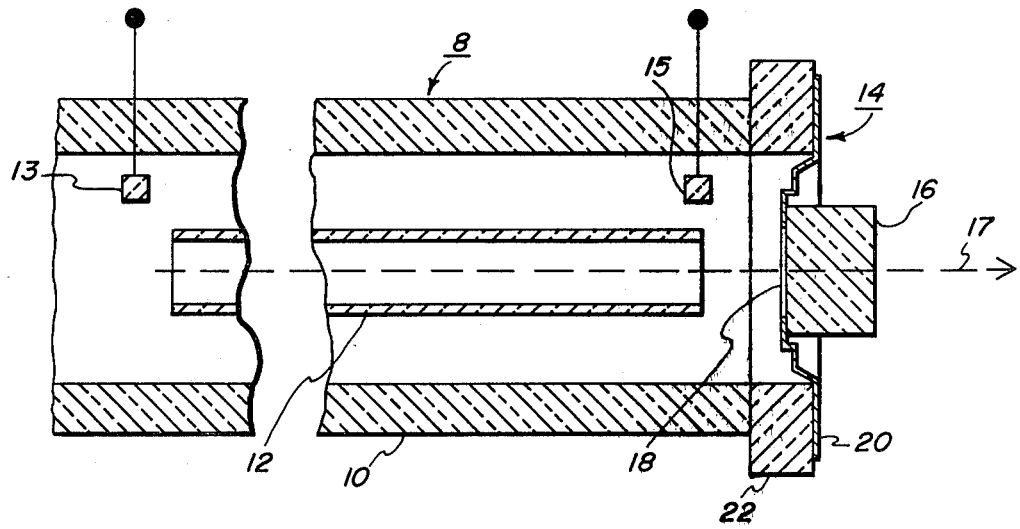
FIG. 1 is a partial side view of a laser tube illustrating the connection thereof to an optical reflecting element assembly fabricated in accordance with the teachings of the present invention.

The laser tube 8, the tube end assembly 14 thereof being fabricated in accordance with the teachings of the present invention, is shown in FIG. 1, may comprise a CW gas laser oscillator, such as a helium-neon gas laser or a gas metal vapor laser, such as a helium-cadmium metal vapor laser. The elongated tubular gas-tight envelope 10, having a central bore 12, is first evacuated to a very low pressure such as $10^{-6}$ Torr and then filled with the lasing gas fill, such as helium-neon gas, to a suitable subatmospheric pressure. The envelope 10 is conveniently made of glass, quartz, ceramic or metal and includes a pair of integral mirror assemblies at each end of the tube (only assembly 14 being illustrated since the other is substantially identical except for the reflecting layer formed thereon). A cathode and anode electrode structure 13 and 15 is contained adjacent the ends of bore 12 for exciting an electrical discharge in the gaseous medium. Optical radiation emitted from the discharge passes in a beam axially to the mirror assemblies to define an optical resonator having a resonant frequency at the optical wavelength of the radiation emitted by the gaseous discharge. A reflecting layer 18, formed on substrate 16, is made only partially reflecting so that a small percentage of the optical radiation falling thereon passes through the mirror to form the output beam 17 of the laser. The light reflecting back and forth between the axially aligned mirrors through the discharge tube produces a coherent emission of optical radiation to form a coherent beam 17. In the case of a helium-neon laser, the output laser beam is typically at a wavelength of approximately 6328A, whereas a helium-cadmium laser produces an output wavelength of approximately 4420A.

Assembly 14 seals the tube end shown and comprises an apertured, recessed cup shaped metal flange member 20 with the substrate 16 and reflecting layer 18 thereon sealed to the metal flange member in a manner to be described hereinafter with reference to FIGS. 3 and 4. The assembly is thereafter joined to a mating flange member 22 formed on the end of envelope 10 either by welding, soldering or other standard techniques. The laser tube 8, with both ends sealed by the assembly described hereinabove, is then subjected to bakeout procedures to remove tube contaminants.

Figure 2:
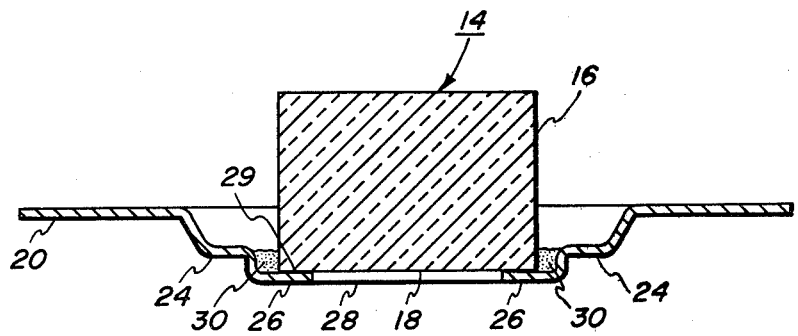
FIG. 2 is a cross-section of the optical reflecting element assembly shown in FIG. 1.

FIG. 2 shows a cross-section of the assembly 14, assembly 14 comprising a disc shaped metal flange member 20 having a series of internal, concentric steplike portions 24 and 26 of decreasing diameter. At the lower portion of member 20 (corresponding to step 26) is an aperture 28 having a diameter of approximately 10 millimeters, the diameter preferably of such a size that when the flange 20 is joined to flange 22, it closely conforms to at least the diameter of bore 12. The optically reflective coating 18 is selected to partially reflect the incident radiation whereby a portion of the radiation is passed through the substrate 16 to form the output beam 17. The partially reflective coating 18 defines one end wall of the optical resonator shown in FIG. 1. A similar assembly (not shown) is disposed at the opposite end of the envelope 10 except that its reflective coating in this case is totally reflecting to define the other end wall of the optical resonator. The surface area of reflective coating 18 may be substantially coextensive with the area of aperture 28 or may extend over the complete surface 29 of substrate 16. The substrate 16, a soft glass, is joined to metal flange member 20 via a devitrified solder glass seal 30. The glass frit is chosen to match the thermal expansion of the glass substrate and metal flange member 20 to minimize the possibility of seal failure during laser tube operation. The seal as described hereinabove will extend the laser tube life by allowing the laser tube to be processed to relatively high temperatures to remove contaminants and by reducing gas permeation through the sealant.

As set forth hereinabove, it is desired that the glass frit, or solder glass, the metal flange member 20 and the substrate 16 should have closely matched thermal coefficients of expansion in addition to the requirement that substrate 16 retain its mechanical dimension during and after thermal cycling to the fritting temperatures (described hereinafter with reference to FIGS. 3 and 4). Typical combinations of materials meeting the aforementioned criteria are set forth in Table I hereinbelow:

| Substrate 16 (glass) | Metal Flange Member 20 | Glass Frit (Solder glass) | Coefficient of Thermal Expansion | Fritting Temperature |
|---|---|---|---|---|
| Corning 0080 | Carpenter Metal #49 | Corning Pryoceram #89 | $85\text{-}92 \times 10^{-7}$ cm/cm/°C. | 440° C. |
| Schott K5 | Carpenter Metal #49 | Corning Pryocram #89 | " | " |
| Schott K5 | Carpenter Metal #49 | Corning Pryoceram #89 | " | " |
| Schott K5 | 4750 Alloy | Corning Pryoceram #89 | " | " |
| Schott K5 | Driver-Harris 152 | Corning Pryoceram #89 | " | " |
| Schott K5 | Platinum | Corning Pryoceram #89 | " | " |
| Schott K5 | Sylvania No. 4 | Corning Pryoceram #89 | " | " |
| Corning 0080 | Carpenter Metal #49 | Kimble Solder Glass #SG-68 | 90 | " |
| Corning 0080 | Carpenter Metal #49 | Kimble Solder Glass #CV-101 | 94 | 425 |
| Corning 0080 | Carpenter Metal #49 | Kimble Solder Glass #CV-135 | 87 | 425 |

Corning 0080 is a glass code number utilized by the Corning Glass Works, Corning, N.Y., to specify a soda lime type glass (known as "Crown" Water White Glass) and Schott K5 is the code utilized by the Schott Optical Glass Company, Duryea, Pa. to designate "Crown" Water White Glass.

Carpenter Metal #49 is the code utilized by the Carpenter Steel Company, Reading, Pa. to describe a metal alloy comprising 49% nickel and 51% iron; and 4750 alloy is the code utilized by the Alleghany-Ludlum Steel Company, Brackenridge, Pa. to describe a metal alloy comprising 47% nickel and 53% iron.

Driver-Harris 152 is the tradename utilized by Driver-Harris Company, Harrison, N.J. to describe a metal alloy comprising 42% nickel, 6% chromium and 52% iron; and Sylvania No. 4 is the tradesname utilized by Sylvania Metals and Chemical Company, Towanda, Pa. to describe a metal alloy comprising 42% nickel, 6% chromium and 52% iron.

Pyroceram (a registered trademark of the Corning Glass Works) No. 89 describes a finely powdered glass composition. The Kimble solder glasses set forth in Table I are glasses manufactured by Owens-Illinois Corporation, Toledo, Ohio.

The glass solders (frits) listed in Table I, when held in suspension by a low viscosity vehicle, allows the resultant slurry to be applied to a sealing area by dipping, pressure flow or by brushing. When the slurry (seal) is fired according to predetermined temperature schedules, a change in the slurry occurs, the glass material developing a partially crystalline structure which results in a strong and hard devitrified glass seal.

U.S. Pat. No. Re. 25,791 describes in detail the characteristics of the solder glass to be utilized in the sealing process; the formation of the slurry and the process steps utilized to form the devitrified seal. The teachings of the aforementioned patent are incorporated herein by reference.

The reflecting layer (coating 18) must withstand the fritting temperatures required to form the seal between the metal flange member 20 and the substrate 16. Typical reflecting coating materials include titanium dioxide, zirconia, cerium oxide, silicon dioxide, magnesium fluoride, calcium fluoride, indium oxide, tin oxide, lithium fluoride, sodium fluoride, cryolite and thoria. The reflecting layer 18 may comprise alternate layers of the aforementioned materials, the layers being adjusted for stoichiometric balance as well as for precise thicknesses. For example, as many as nineteen alternate layers of titanium dioxide and silicon dioxide may be used as He-Ne gas laser reflectors.

Figure 3:
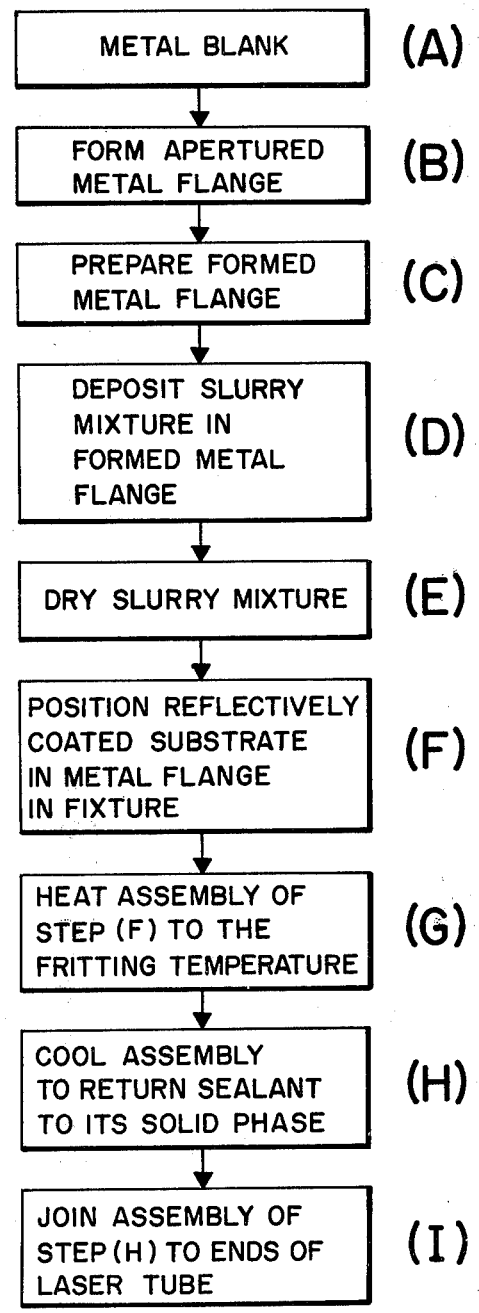
FIG. 3 is a flow-chart depicting the fabrication of the optical reflecting element assembly shown in FIG. 1.

Referring now to FIG. 3, the steps in fabricating the laser mirror assembly 14 are illustrated. In particular, a metal blank (step A), such as Carpenter Metal No. 49, is provided and formed into an apertured metal flange member 20 by standard techniques (step B).

The formed metal flange is prepared in the following way (step C): The flange is first degreased to remove any oil or other grease material formed thereon. The sealing area is sandblasted with pure aluminum oxide 100 mesh grit to provide a good wetting surface for the slurry. The flange is then washed and dried and then oxidized and annealed in wet hydrogen at approximately 1000° C. for approximately 30 minutes.

A selected glass frit is then mixed with a carrier or vehicle such as amylacetate containing approximately one percent nitrocellulose binder to form a thick slurry. In step (D), the slurry is poured into the metal flange (a removable stop member 33 is placed on the aperture to prevent the slurry from flowing therethrough) and allowed to dry for a period of approximately 15 hours (step E) to form a hardened powder. The amylacetate is substantially volatilized during the drying process. The hardened powder excess may be dressed by standard techniques. The stop member is removed from the aperture and the selected substrate and reflecting layer and flange are then placed in a two part fixture and then put into an oven (step F). The fixture is arranged to hold the substrate and flange to a very close tolerance, the upper fixture portion being of sufficient weight to press the reflecting layer and flange together via the hardened powder thereby forming the seal.

The temperature of the oven is then brought to approximately 350° C. for about 30 minutes to burn off any organic binders in the hardened powder. The temperature then is increased to the fritting temperature of approximately 440° C. (lower for the Kimble solder glasses listed in Table I) for 50 minutes, during which time the hardened powder, including the glass frit, surrounds and wets the contacting areas of the reflecting layer substrate and metal flange, and permits the formation of a seal and subsequent devitrification. The oven is then cooled slowly to approximately 150° C. whereby the substrate 16 is hard sealed to the metal flange member 20 (step H). The assembly is then joined (step I) to a mating flange member 22 (FIG. 1) formed on the ends of the envelope 10 in a gas-tight manner. The envelope 10 containing the assemblies at opposite ends thereof is then baked and evaporated to a low pressure to produce outgassing of the envelope and associated parts before the envelope is filled with the lasing gaseous medium.

Figure 4:
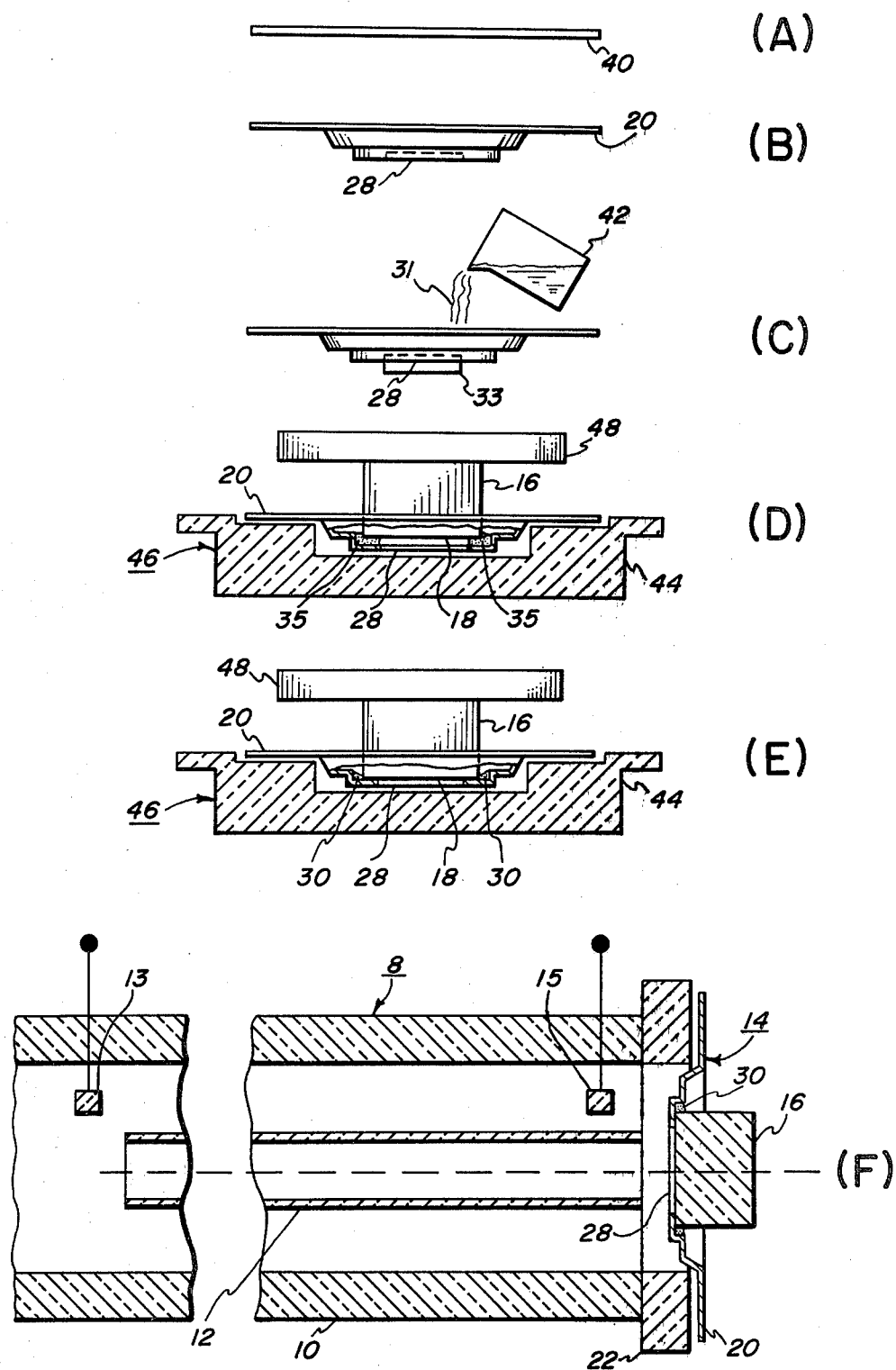
FIG. 4 illustrates, in simplified form, the steps in fabricating the optical reflecting assembly of the present invention.

FIG. 4 schematically illustrates, in simplified form, the steps utilized to fabricate the optical mirror assembly of the present invention. A disc shaped, cylindrical metal blank 40 is provided (step A) and formed to the cup-shape, apertured member shown in (step B). It should be noted that the same reference numerals have been utilized in each figure to identify similar elements. After the flange sealing area is prepared, the slurry 31 is poured into the recess of the flange via dispenser 42 (step C), stop member 33 preventing the slurry from flowing through the flange aperture 28. In step (D), the flange member 20 is placed in a first portion 44 of fixture 46 and the weighted second portion 48 of fixture 46 is placed on the non-reflecting surface of substrate 16 to force the reflecting surface of substrate 16 into contact with the bottom of the flange member 20 via the hardened powder 35, forming a hard seal (step D). The stop member 33 is removed and the fixture is placed in an oven, heated and cooled as set forth hereinabove. At this point, the devitrified glass 30 forms a seal between the glass substrate 16 and the metal flange member 20 (step E). The assembly thus formed is removed from the oven and fixture and is joined to a mating flange 22 formed on each end of the tube envelope (step F). The metal flange member 20 can be joined to the mating flange by utilizing any one of a number of prior art techniques, such as welding or bonding.

The hard sealed, bakeable laser reflectors assembled as set forth hereinabove were tested to quantify the vacuum tightness, temperature sensitivity, humidity and operating and shelf lifetimes of the sealed laser reflector assemblies. The hermeticity of each assembly was tested by utilizing a mass spectrometer leak detector peaked for helium detection. It was determined that the vacuum tightness of the laser reflector assemblies tested were leak tight to less than $3 \times 10^{-10}$ atmospheres cc/sec.

Gas laser tubes having the reflector assemblies mounted thereto were thermally cycled from -45° C. to 100° C. twenty-five times. Further, the laser tubes were cold-soaked for 100 hours in a -45° C. condensable environment. The laser light output was utilized as a measure of the laser reflector performance and the output was not significantly changed after thermal cycling and cold soaking, the laser reflectors therefore retaining their optical properties and leak tightness.

The operating lifetime of the gas laser tubes using the aforementioned laser reflector assembly has been shown to be greater than 8000 hours with the tube being cycled more than 200,000 times without failure. The cycling of the laser tube consisted of switching the tube from a lasing condition to a non-lasing condition, the tube lasing for approximately 118 seconds and non-lasing for approximately 7 seconds. The shelf life of gas laser tubes using the reflector assemblies has been tested and has yielded lifetimes of approximately one and one-half years to this data without failure.

While the invention has been described with reference to its preferred embodiment, it will be understood by those skilled in the art that various changes may be made and equivalents may be substituted for elements without departing from the true spirit and scope of the invention. In addition, many modifications may be made to adapt a particular situation or material to the teaching of the invention and without departing from its essential teachings.

What is claimed is:

1. An internal mirror type laser tube having an active medium contained in an elongated envelope and means for mounting a mirror to each end of the envelope, said mounting means comprising a metal member having an aperture formed therein, a mirror comprising a glass substrate having a reflecting layer formed on one surface thereof, and bonding means comprising a glass solder for bonding said glass substrate to said metal member in a manner whereby said reflecting layer is aligned with said aperture, the glass substrate, bonding means and the metal member having co-efficients of thermal expansion which are substantially equal.

2. The laser tube as defined in claim 1 wherein said reflecting layer overlies said aperture, the surface area of said reflecting layer being at least equal to the area of said aperture.

3. The laser tube as defined in claim 2 wherein a metal flange member is bonded to each end of the envelope, a metal member being joined to each flange member thereby forming a hermetically sealed laser tube.

4. The laser tube as defined in claim 3 further including means for exciting an electrical discharge in said active medium to produce a beam of coherent light, one of said mirrors having a reflecting layer which reflects coherent light incident thereon, thereby forming one end of an optical resonator, the other of said mirrors having a partially reflecting layer thereon which forms the other end of the optical resonator and the optical output element for the coherent light beam.

5. The laser tube as defined in claim 1 wherein said glass substrate is external to said sealed laser tube.

6. The laser tube as defined in claim 1 wherein said reflecting layer comprises a material which is capable of withstanding the bakeout temperatures of the tube.

7. The laser tube as defined in claim 6 wherein said reflecting layer comprises alternate layers of materials selected from the group consisting of titanium dioxide, zirconia, cerium oxide, silicon dioxide, magnesium fluoride, calcium fluoride, indium oxide, tin oxide, lithium fluoride, sodium fluoride, cryolite and thoria.

8. The laser tube as defined in claim 7 wherein said alternate layers comprise titanium dioxide and silicon dioxide.

9. The laser tube as defined in claim 1 wherein said metal member comprises a metal alloy of nickel and iron and said glass substrate comprises a soft glass.

10. A member for mounting a mirror to the ends of an internal mirror type laser tube envelope having an active medium therein, said mounting member comprising a metal member having an aperture formed therein, a mirror comprising a glass substrate having a reflecting layer formed on one surface thereof, and bonding means comprising a glass solder for bonding said glass substrate to said metal member in a manner whereby said reflecting layer is aligned with said aperture, the glass substrate, bonding means and the metal member having coefficients of thermal expansion which are substantially equal.

11. The mounting member as defined in claim 10 wherein said reflecting layer overlies said aperture, the surface area of said reflecting layer being at least equal to the area of said aperture.

12. The mounting member as defined in claim 11 wherein a metal flange member is bonded to each end of the envelope, a metal member being joined to each flange member thereby forming a hermetically sealed laser tube.

13. The mounting member as defined in claim 12 further including means for exciting an electrical discharge in said active medium to produce a beam of coherent light, one of said mirrors having a reflecting layer which reflects coherent light incident thereon, thereby forming one end of an optical resonator, the other of said mirrors having a partially reflecting layer thereon which forms the other end of the optical resonator and the optical output element for the coherent light beam.

14. The mounting member as defined in claim 10 wherein said reflecting layer comprises a material which is capable of withstanding the bakeout temperatures of the laser tube.

15. The mounting member as defined in claim 14 wherein said reflecting layer comprises alternate layers of materials selected from the group consisting of titanium dioxide, zirconia, cerium oxide, silicon dioxide, magnesium fluoride, calcium fluoride, indium oxide, tin oxide, lithium fluoride, sodium fluoride, cryolite and thoria.

16. The mounting member as defined in claim 15 wherein said alternate layers comprise titanium dioxide and silicon dioxide.

17. The mounting member as defined in claim 10 wherein said metal member comprises a metal alloy of nickel and iron and said glass substrate comprises a soft glass.

18. A method for forming a hard sealed mirror assembly and mounting the formed assembly to at least one end of an internal type laser tube having an elongated envelope with a metal flange member joined to at least one end thereof comprising the steps of:
providing a recessed metal member having an aperture formed therein,
preparing a slurry comprising a glass solder and carrier,
introducing the slurry into the recessed portion of said recessed metal member,
forming a mirror assembly by placing a mirror element in the recessed portion of said recessed metal member, the mirror element comprising a glass substrate having a reflecting layer formed on one surface thereof, the mirror element being positioned in said recessed metal member so that said reflecting layer is aligned with said aperture,
heating said mirror assembly to the sealing temperature of the glass solder to form a glass seal between the mirror element and the recessed metal member,
cooling the mirror assembly at a predetermimed rate whereby the mirror element is hard sealed to the recessed metal member, and
mounting said mirror assembly to the metal flange member joined to the end of the envelope.

19. The method as defined in claim 18 further including the step of applying a force to the other surface of the glass substrate during the heating of the mirror assembly.

20. The method as defined in claim 19 further including the step of drying the slurry after it is introduced into the recessed portion of the metal member.

21. The method as defined in claim 20 further including the steps of placing a stop member in said aperture prior to introducing the slurry into the recessed portion of the metal member and removing the stop member after the slurry is dried.

22. An internal mirror type laser tube having an active medium contained in an elongated envelope and means for mounting a mirror to each end of the envelope, said mounting means comprising a recessed metal member formed of a metal alloy of nickel and iron and having an aperture formed therein, a mirror comprising a soft glass substrate having a reflecting layer formed on one surface thereof, said reflecting layer comprising a material which is capable of withstanding the bakeout temperature of the tube, and bonding means comprising a glass solder for bonding said glass substrate to said recessed metal member in a manner whereby said reflecting layer is aligned with said aperture, the glass substrate, bonding means and the recessed metal member having coefficients of thermal expansion which are substantially equal, said recessed metal member having a series of internal concentric step-like portions of decreasing diameter, the aperture being formed in the smallest diameter step, the reflecting layer surface of said soft glass substrate being aligned therewith.

23. A member for mounting a mirror to the ends of an internal mirror type laser tube envelope having an active medium therein, said mounting member comprising a recessed metal member comprising a metal alloy of nickel and iron having a series of internal concentric step-like portions of decreasing diameter, an aperture being formed in the smallest diameter step, a mirror comprising a soft glass substrate having a reflecting layer formed on one surface thereof, said reflecting layer comprising a material which is capable of withstanding the bakeout temperatures of the laser tube, said reflecting layer surface being supported by the smallest diameter step of said recessed metal member, and bonding means for bonding said glass substrate to said recessed metal member in a manner whereby said reflecting layer is aligned with said aperture, said bonding means comprising a glass solder, the glass substrate, bonding means and the recessed metal member having coefficients of thermal expansion which are substantially equal.

24. A method for forming a hard sealed mirror assembly and mounting the formed assembly to at least one end of an internal type laser tube having an elongated envelope with a metal flange member joined to at least one end thereof comprising the steps of:

providing a recessed metal member having an aperture formed therein, said metal member having a series of internal concentric step-like portions of decreasing diameter, the aperture being formed in the smallest diameter step, said metal member comprising a metal alloy of nickel and iron, preparing a slurry comprising a glass solder and carrier, introducing the slurry into the recessed portion of said recessed metal member, forming a mirror assembly by placing a mirror element in the recessed portion of said recessed metal member, the mirror element comprising a soft glass substrate having a reflecting layer formed on one surface thereof, said reflecting layer comprising a material which is capable of withstanding the bakeout temperatures of the tube, the mirror element being supported by the smallest diameter step in said recessed metal member so that said reflecting layer is aligned with said aperture the surface area of said reflecting layer being at least equal to the area of said aperture, heating said mirror assembly to the sealing temperature of the glass solder to form a glass seal between the mirror element and the recessed metal member, cooling the mirror assembly at a predetermined rate whereby the mirror element is hard sealed to the recessed metal member, mounting said mirror assembly to the metal flange member joined to the end of the envelope, and subjecting the laser tube to its bakeout temperature to remove substantially all of the contaminants contained therein.

25. A gas laser tube comprising:
(a) a gas-tight envelope having a longitudinal portion with opposite open ends;
(b) metal end members sealing said open ends of said envelope portion, each of said end members having an aperture therethrough;
(c) a capillary bore member disposed within said envelope portion and having a longitudinal bore aligned with said apertures through said end members;
(d) a different reflecting means bonded to each one of said end members and sealing each said aperture therethrough; said reflecting means forming an optical resonant cavity with said bore; at least one of said reflecting means being partially transparent for passage of an output laser beam;
(e) a laser gas within said envelope, and
(f) electrode means within said envelope for providing a gaseous discharge through said bore.

26. The gas laser tube of claim 25, wherein said capillary bore member is made of glass.

27. The glass laser tube of claim 25, wherein each of said end members has a flanged portion external to said envelope.

28. The gas laser tube of claim 25, wherein said envelope portion is made of glass.

29. The gas laser tube of claim 25, wherein said gas is a mixture of helium and neon.

30. The gas laser tube of claim 25, wherein said envelope portion is cylindrical, said capillary bore tube being mounted within said envelope with said bore coaxial with said cylindrical envelope portion.

* * * * *

Disclaimer and Dedication

4,233,568.—*Randolph W. Hamerdinger* and *Robert C. McQuillan,* Glendora, Calif. LASER TUBE MIRROR ASSEMBLY. Patent dated Nov. 11, 1980. Disclaimer and dedication filed Apr. 2, 1984, by the assignee, *Xerox Corp.*

Hereby disclaims and dedicates the entire term of said patent to the Public.
[*Official Gazette May 22, 1984.*]